Patented Mar. 11, 1924.

1,486,256

UNITED STATES PATENT OFFICE.

HUBERT MERRYWEATHER, OF BETHLEHEM, PENNSYLVANIA, ASSIGNOR TO BETHLEHEM STEEL COMPANY, OF SOUTH BETHLEHEM, PENNSYLVANIA, A CORPORATION OF PENNSYLVANIA.

TREATMENT OF ORES.

No Drawing.   Application filed February 20, 1920. Serial No. 360,041.

*To all whom it may concern:*

Be it known that I, HUBERT MERRYWEATHER, a citizen of the United States, residing at Bethlehem, Northampton County, Pennsylvania, have invented new and useful Improvements in the Treatment of Ores, of which the following is a specification.

My invention relates to the roasting and leaching of ores. In roasting and leaching certain metals are separated from their gangues or a separation is made between certain metals or groups of metals. In carrying out my process I preferably add to the raw ore a portion of the liquid from a previous leach and then roast and leach the ore thus treated. In this manner I have found that a greater extraction or separation may be obtained than can be secured from a simple or ordinary roast and leach.

My invention therefore comprises a decrease in the proportion of one or more of the constituents of the ore which are more expensive to work and the recovery of certain of them.

The following is a typical example of carrying out my invention:—

I take an iron ore, such as limonite, at any stage of its treatment and preferably after it has been dried, and introduce it into a roasting furnace with some sulphur-bearing material, such as pyrites, unless it contains of itself sufficient sulphur, and there roast it at a suitable temperature, and below the point of decomposition of the sulphates of the elements to be extracted, for the purpose of rendering the nickel or other elements contained in the ore more soluble. I then remove the ore and leach it, preferably with water. I have found sea water particularly effective as this causes the ore to settle rapidly. By this operation I have been able to recover a substantial proportion of the nickel content of the ore in the resulting solution. I next add the solution (or a portion thereof) containing the nickel to the succeeding charge of ore. After roasting the charge is leached with water and the resulting solution carries not only the nickel contained in the added solution but also a proportion of the nickel in the new charge greater than the proportion obtained from the first charge. The operation is repeated by adding the solution (or a portion thereof) to each succeeding charge, a greater proportion of the nickel contained in each such charge after roasting and leaching being recovered than was obtained from the initial charge without the addition of solution to the raw ore.

In addition to the nickel, the leaching will carry off substantial proportions of the cobalt, alumina and manganese, and all of these elements can be recovered by precipitation or other methods of separation.

The following are typical analyses of an ore containing nickel, cobalt, alumina and manganese: (1) after drying at 212° F. and before roasting; and (2) after treatment with a solution obtained from a preceding charge and roasting and leaching—

| Iron. | Nickel. | Cobalt. | $Al_2O_3$. | Manganese. | Combined moisture. |
|---|---|---|---|---|---|
| (1) 45.–53. | .6–2. | .10–.40 | 3.–12. | .5–2 | 10.–12. |
| (2) 53.–61. | .2–.45 | Trace to .20 | 2.–8. | .06–.13 | 4.–5. |

It will, therefore, be seen that by my improved process the proportion of iron is increased and not only is the major portion of the nickel recovered but other metals or minerals, such as cobalt, alumina and manganese, may also be recovered.

The terms and expressions which I have employed are used as terms of description and not of limitation, and I have no intention, in the use of such terms and expressions, of excluding any equivalents of the features shown and described, or portions thereof, but recognize that various modifications are possible within the scope of the invention claimed.

What I claim is:

1. The method of treating an ore, which comprises submitting the ore in the presence of sulphur to a roasting temperature below the point of decomposition of the sulphates of the elements to be extracted, next leaching it and adding from the resulting solution to another charge of ore, then roasting and leaching the second-mentioned charge, whereby a larger proportion of one of the constituent elements contained in the second-mentioned and succeeding charge is recovered than from the first-mentioned charge.

2. The method of treating an ore which comprises roasting the ore at a roasting temperature below the point of decomposition of the sulphates of the elements to be extracted, in the presence of sulphur, next leaching it with water and adding from the resulting solution to another charge of ore, then roasting and leaching the second-mentioned charge, whereby there is obtained from the resulting solution an extraction of the nickel contained in the second-mentioned charge greater than from the first-mentioned charge.

3. The method of treating an ore which comprises roasting the ore at a roasting temperature below the point of decomposition of the sulphates of the elements to be extracted, in the presence of sulphur, next leaching it and adding from the resulting solution to another charge of ore, then roasting and leaching the second-mentioned charge, whereby approximately 70% of the nickel contained in the second-mentioned charge is recovered in the resulting solution.

4. The method of treating an ore which comprises roasting the ore at a roasting temperature below the point of decomposition of the sulphates of the elements to be extracted, in the presence of sulphur, next leaching it and adding from the resulting solution to another charge of ore, then roasting and leaching the second-mentioned charge, whereby there is obtained from the resulting solution an extraction of the nickel greater than from the first-mentioned charge and a large proportion of the cobalt, alumina and manganese also contained in the second-mentioned charge.

5. The method of treating an ore such as limonite which comprises roasting the ore at a roasting temperature below the point of decomposition of the sulphates of the elements to be extracted, in the presence of sulphur, next leaching it and adding the resulting solution to another charge of ore, then roasting and leaching the second-mentioned charge, whereby there is recovered substantially all of the nickel in the added solution and an amount of nickel from the second-mentioned charge proportionately greater than from the first-mentioned charge in the resulting solution.

6. The method of treating an ore, which comprises submitting the ore in the presence of sulphur to a roasting temperature below the point of decomposition of the sulphates of the elements to be extracted, next leaching it, and adding from the resulting solution to another charge of ore, then roasting and leaching the second-mentioned charge and repeating the cycle on succeeding charges, whereby a large proportion of one of the constituent elements contained in succeeding charges is recovered in the resulting solutions.

7. The method of treating an ore, which comprises submitting the ore in the presence of sulphur to a roasting temperature below the point of decomposition of the sulphates of the elements to be extracted, next leaching it with sea water, and adding from the resulting solution to another charge of ore, then roasting and leaching the second-mentioned charge and repeating the cycle on succeeding charges, whereby a large proportion of one of the constituent elements contained in succeeding charges is recovered in the resulting solutions.

HUBERT MERRYWEATHER.